United States Patent [19]
Cole

[11] Patent Number: 5,451,970
[45] Date of Patent: Sep. 19, 1995

[54] RADAR ANTENNA UNIT HAVING A PLURALITY OF HEAT DISSIPATING FINS FORMING ON THE EXTERIOR OF A CONE SHAPED CHAMBER

[76] Inventor: Carroll R. Cole, 2313 Ramsey Dr., Decatur, Ill. 62526

[21] Appl. No.: 891,984

[22] Filed: May 28, 1992

[51] Int. Cl.⁶ .......................................... H01Q 13/00
[52] U.S. Cl. ................................ 343/786; 343/711; 343/721; 343/773
[58] Field of Search ............... 343/786, 789, 772, 773, 343/784, 872, 873, 909, 753, 711, 720, 721

[56] References Cited

U.S. PATENT DOCUMENTS

| | | | |
|---|---|---|---|
| 3,611,396 | 10/1971 | Jones, Jr. | 343/786 |
| 4,590,479 | 5/1986 | Ben-Dov | 343/771 |
| 4,672,328 | 6/1987 | Adachi et al. | 330/286 |
| 4,700,195 | 10/1987 | Boan et al. | 343/786 |
| 4,775,867 | 10/1988 | Sokol et al. | 343/786 |
| 4,778,970 | 10/1988 | Klaila | 219/10.55 |
| 4,788,553 | 11/1988 | Phillips | 343/753 |
| 4,897,663 | 1/1990 | Kusano et al. | 343/786 |
| 5,003,321 | 3/1991 | Smith et al. | 343/786 |
| 5,109,232 | 4/1992 | Monte | 343/786 |
| 5,313,213 | 5/1994 | Neumann et al. | 343/711 |

FOREIGN PATENT DOCUMENTS

| | | | |
|---|---|---|---|
| 0082507 | 6/1980 | Japan | 343/786 |
| 0128469 | 5/1991 | Japan | 343/786 |
| 0828275 | 5/1981 | U.S.S.R. | 343/786 |

*Primary Examiner*—Donald Hajec
*Assistant Examiner*—Tan Ho
*Attorney, Agent, or Firm*—Wood, Phillips, VanSanten, Clark & Mortimer

[57] ABSTRACT

Heat dissipation problems in a sealed radar antenna unit are avoided in a construction including a generally cylindrical body (10) of metal having opposed ends (12, 14) and an interior, cone shaped chamber (16). The cone shaped chamber (16) has a wide opening (18) at the end (12) at a narrow opening (20) at the end (14). A plurality of peripheral grooves (30, 32, 34, 36 and 38) extend about the periphery of the body (10) between the ends (12), (14) thereof to define heat dissipating fins (40) integral with the body (10).

13 Claims, 4 Drawing Sheets

RADAR ANTENNA UNIT HAVING A PLURALITY OF HEAT DISSIPATING FINS FORMING ON THE EXTERIOR OF A CONE SHAPED CHAMBER

FIELD OF THE INVENTION

This invention relates to a radar antenna unit, and more particularly, to a small size radar antenna unit such as may be advantageously employed in determining the velocity of wheeled vehicles.

BACKGROUND OF THE INVENTION

Small radar units are almost universally employed in the United States and elsewhere by traffic authorities to monitor the speed of wheeled vehicles. In the last several years, these devices have almost always been of a small size so as to be readily hand-held. Traffic authorities have typically mounted the radar units within a vehicle as on the dash thereof so that the occupant of the vehicle may hand-hold the unit to point it in whichever direction he likes or, in the alternative, have his hands free by using whatever mount is provided within the vehicle.

Recent months have seen a considerable increase in concern for the effects of the microwaves generated by these units on the user of the device, particularly when the user is hand-holding the same. There are some indications, not yet proven, that certain cancers may be brought about by prolonged exposure to the microwaves generated by the radar unit over a substantial period of time. As a consequence, a number of users of the radar unit do not want to occupy a vehicle having such a unit on the interior thereof. In addition, because the units are typically mounted within the vehicle for ready movement between hand-held and dash-mounted positions of use, they may not always be firmly affixed within the vehicle. Should a crash occur, the unit may become loose and move at a high velocity relative to the vehicle interior. When this occurs, an occupant of the vehicle can be struck by the unit and injured. This has sparked a renewed interest in mounting of the units on the exterior of the vehicle. However, one cannot simply take an existing radar unit from the interior of the vehicle and mount it on the vehicle exterior. Current units generally are not waterproof and, as a consequence, cannot be mounted on the exterior of a vehicle. Thus, there is a need for a waterproof radar antenna that may be mounted in a hostile environment.

This need cannot be simply met by encapsulating an existing unit in some sort of a waterproof housing. Those skilled in the art will readily recognize that an oscillator is mounted to the antenna unit and when the unit is in operation, the oscillator generates considerable heat. Thus, some means must be provided to dissipate the heat without providing a path for entry of water or other contaminating material.

Furthermore, prior art construction typically include separate horn and turnstile cavity subassemblies which must be fitted together. The joint will impede heat transfer from the turnstile cavity subassembly to the horn, an obviously undesirable occurance, and can result in excessive signal noise levels.

The present invention is directed to overcoming one or more of the above problems.

SUMMARY OF THE INVENTION

It is the principal object of the invention to provide a new and improved radar antenna unit. More specifically, it is an object of the invention to provide such a unit that is readily adaptable for use in traffic work and which may be mounted on the exterior of a vehicle or the like without concern for the effects of water or other contaminants on the unit.

An exemplary embodiment of the invention achieves the foregoing object in a structure, including a body of metallic material having a cone shaped chamber with a wide end open to the exterior of the body and a narrow end opening to a turnstile cavity. A plurality of heat dissipating fins are formed on the exterior of the body around the chamber. Consequently, when an oscillator is mounted to the body and the turnstile cavity, heat generated thereat will be conducted by the body to the external fins to be dissipated thereby. This allows the chamber and other parts of the unit to be sealed.

In a preferred embodiment, an oscillator is mounted on the body in operable relation with the cavity, and a cup shaped housing element surrounds part of the body and contains the oscillator while leaving the fins exposed.

In a highly preferred embodiment, the housing element is functionally imperforate and there is also provided a seal at the interface of the housing element and the body.

In one embodiment of the invention, the housing element is a spotlight housing which also contains a spotlight so that both the radar unit and the spotlight may be used by an operator.

Preferably, the body is generally in the form of a cylinder and the wide end of the chamber opens to an end of the cylinder and the fins are defined by peripheral grooves in the surface of the cylinder adjacent the end to which the chamber opens.

Preferably, the ones of the grooves most remote from the cylinder end are progressively deeper than the ones of the grooves nearest the cylindrical end.

In another embodiment, the housing includes a single opening in which the body is received.

The invention contemplates that there be a narrow opening from the cone shaped cavity at the other end of the cylinder and that there be a recess at such other end at least partially about the narrow opening. A radial bore is located in the body and extends to the recess and terminates short of the narrow opening. The radial bore may then serve to receive electrical conductors passing to the interior of the housing and may be readily sealed.

In a preferred embodiment, a lens is press-fitted into the wide opening of the cone shaped cavity. According to this embodiment, the wide opening terminates in a short cylindrical section and the lens includes a cylindrical periphery that is press-fitted into the cylindrical section.

In a highly preferred embodiment, the body, at the end having the narrow opening, includes a radial groove that opens away from the wide opening and intersects the narrow opening. An oscillator is mounted on the body at one end of the radial groove.

Other objects and advantages will become apparent from the following specification taken in connection with the accompanying drawings.

DESCRIPTION OF THE PREFERRED EMBODIMENTS

Figure 1:
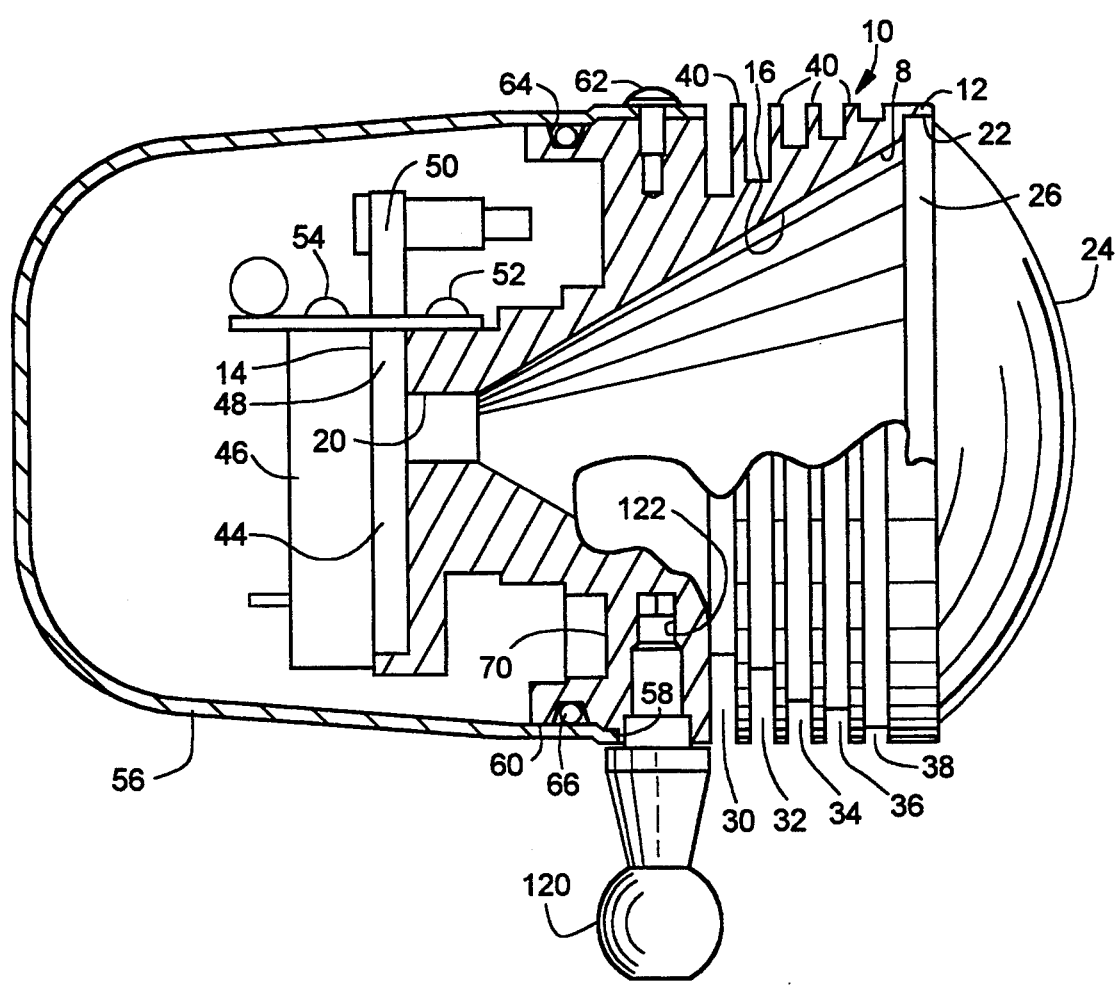
FIG. 1 is a side elevation of a radar antenna unit made according to the invention with parts thereof broken away for clarity.
Figure 2:
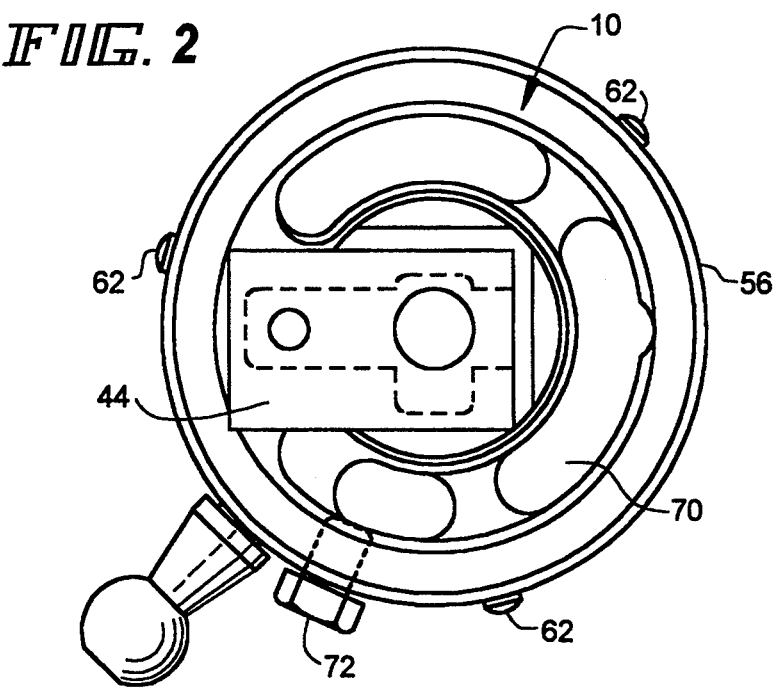
FIG. 2 is a sectional view of the radar unit.

An exemplary embodiment of a radar antenna made according to the invention is illustrated in FIGS. 1 and 2 and is seen to include a cylindrical body, generally designated 10, formed of a metallic material. Aluminum is preferred because of its high thermal conductivity. The body 10 includes a first end 12 and an opposite end 14. Within the body 10 is a conical chamber 16. The chamber 16 has a wide opening 18 at the end 12 and a narrow opening 20 of generally cylindrical shape at the end 14.

In actuality, the wide opening 18 terminates in a short cylindrical section 22. A conventional lens 24 having a cylindrical peripheral section 26 of slightly greater diameter than that of the cylindrical section 22 and which is made of a material transparent to microwaves while serving to focusing them is press-fitted into the opening 16 with the cylindrical periphery 26 being press-fitted into the cylindrical section 22.

This construction provides a watertight interface between the lens 24 and the body 10 without the need for the use of cements or adhesives to mount the lens 24 in place or without the need to form the body 10 over the periphery of the lens 24 as has been done in other units.

The body 10, adjacent the end 12, includes a series of relatively closely spaced peripheral grooves 30, 32, 34, 36 and 38. It will be observed that the depth of the grooves 30, 32, 34, 36 and 38 is progressively greater as one moves from the end 12 toward the end 14. The result of the grooves 30, 32, 34, 36 and 38 is to provide a series of peripheral, heat dissipating fins 40 that are truly integral with the body 10 in the sense that they are formed therewith in one piece and thus establish a highly efficient path for heat transfer from the main part of the body 10 to the fins 40 themselves.

It will, of course, be appreciated that the deeper the grooves 30, 32, 34, 36 and 38, the greater the surface area of the fins 40 to maximize heat transfer. The increasing depth of the grooves 30, 32, 34, 36 and 38 is accommodated by the progressive narrowing of the interior of the cavity 16 as a result of its cone shape.

The end 14 of the body 10 includes a generally cross-shaped recess or groove 44 which, together with a plate 46, defines a conventional turnstile cavity having the configuration shown in FIG. 2. The groove 44 intersects the narrow end 20 of the cavity 16 and is closed by the plate 46 which is abutted directly against the end 14 of the body 10 and secured thereto by suitable means such as threaded fasteners (not shown).

At one end 48 of the recess 44, a conventional oscillator assembly 50 is mounted. The oscillator assembly 50 is mounted by threaded fasteners 52 to the body 10 and by threaded fasteners 54 to the plate 46.

Those skilled in the art will readily recognize that the oscillator 50, when in operation, will be a source of heat. By reason of the mounting directly on the body 10 as well as on the plate 46 which is directly abutted to the body 10, an excellent path of heat transfer from the oscillator 50 through the body 10 to the heat dissipating fins 40 is provided. To this end, it is preferable that the plate 46 also be formed of a metal that is highly thermally conductive as, for example, aluminum.

This excellent heat dissipation allows the use of a cup shaped housing 56 to be fitted about the end 14 of the body 10 to contain the oscillator 50 without concern that the housing 56 will retain heat that could damage electronic components. In the embodiment illustrated in FIGS. 1 and 2, the housing 56 has a single opening 58 that is fitted about a slightly reduced diameter, stepped section 60 of the body 10 and secured in place by threaded fasteners 62 apart from the opening 58, the housing 56 is imporforate. It will be observed that the body 10, in the stepped section 60 includes a radially outwardly opening, relatively shallow groove 64 in which an O-ring 66 is disposed. The O-ring 66 thus seals the interface of the housing 56 and the body 10 against water or other contaminants.

Figure 3:
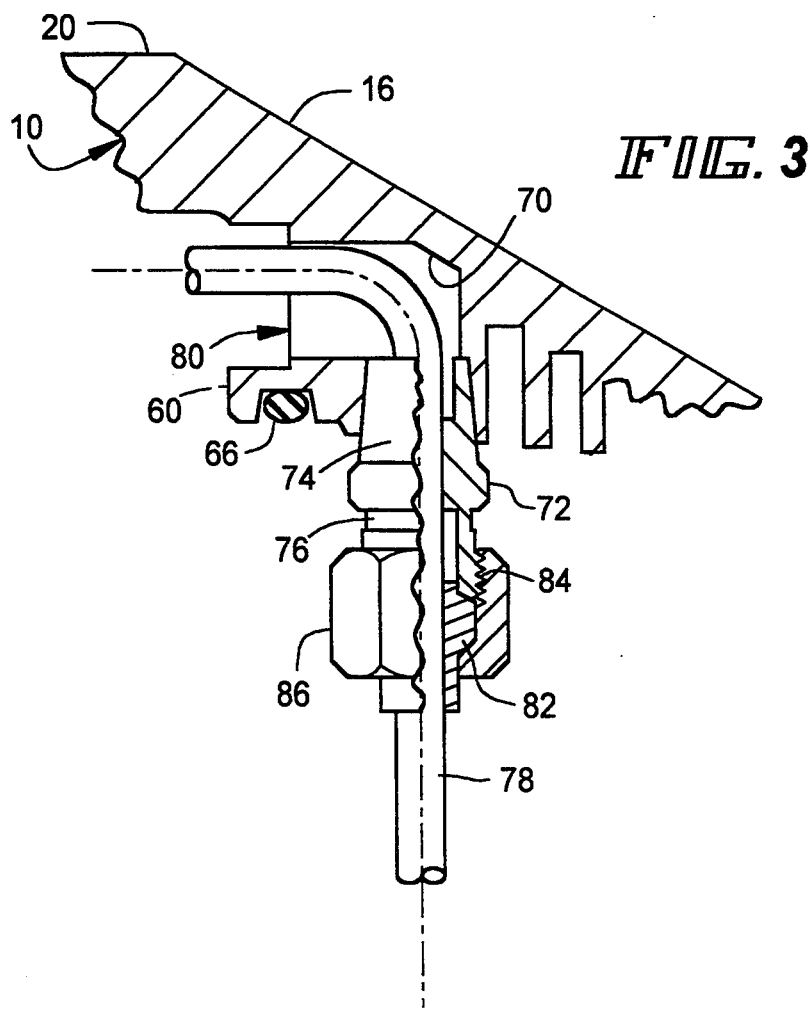
FIG. 3 is a fragmentary sectional view of the unit showing a means for introducing electrical conductors into the unit.

The end 14 also includes a semi-peripheral recess 70. This recess is advantageously employed in routing electrical conductors as will be described. As seen in FIGS. 2 and 3, a generally radial bore 72 receives the slightly tapered threaded end 74 of a hollow fitting 76. The tapered end 74 acts like a pipe thread in the bore 72 to achieve a good seal. Electrical conductors 78 extend through the fitting 76 to the recess 70 which intersects the bore 72 as seen in FIG. 3. Sealing material 80 may be potted within the recess 70 to provide an air and water-tight seal between the cable 78 and the body 10 at the fitting 76. The conductor 78 may be readily routed around the turnstile cavity by placement within the recess 70.

Alternatively, or in addition to the potting 80, a plastic ferrule 82 may be disposed about the conduit 78 to extend partially into the fitting 76 at the end 84 thereof. A compression nut 86 is threaded to the end 84 of the fitting 76 and is tightened to compress the ferrule 82 to cause the same to deform and tightly and sealingly engage both the fitting 76 and the conduit 78.

It will be observed that the construction of FIG. 3 allows installation or removal of the housing 56 without requiring manipulation of the conduit 78 because the fitting 76 is mounted on the body 10 rather than the housing 56. Thus, there is no need to provide a length of conduit 78 within the housing 56 sufficient to allow the housing to be removed for servicing without disconnecting the conduit 78. This eliminates any need for coiling or stuffing conduit within the housing 56, an operation that can be time consuming during installation or cause other problems.

Figure 4:
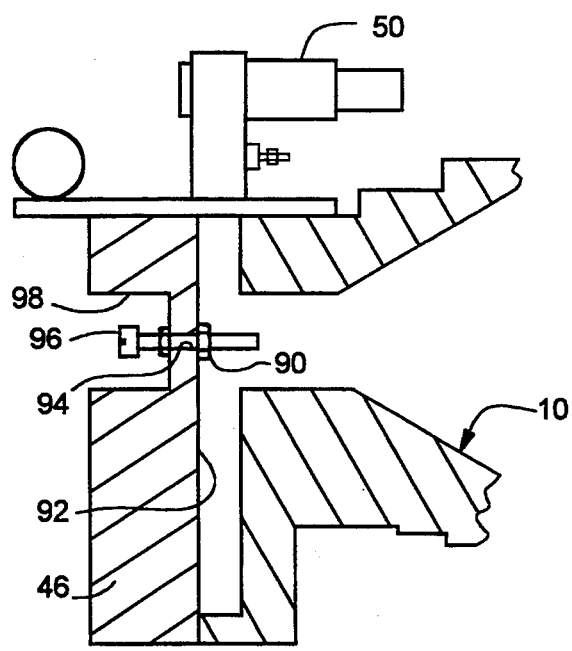
FIGS. 4 and 5 are sectional views showing details of a turnstile cavity used in the invention.

FIG. 4 illustrates in greater detail, the construction of the plate 46. A button 90 of conventional construction is integral with the plate 46 and can be formed thereon simply by machining away part of the surface of the plate 46 to form a somewhat relieved surface 92 about the bottom 90. A threaded aperture 94 extends through the plate 46 at the button 90 and receives an adjusting screw 96 for conventional purposes. A recess 98 about the adjusting screw 96 allows ready access thereto.

The use of an integral button 90 rather than a part separate from the plate 46 results in less loss in this high current area of the antenna unit.

Figure 5:
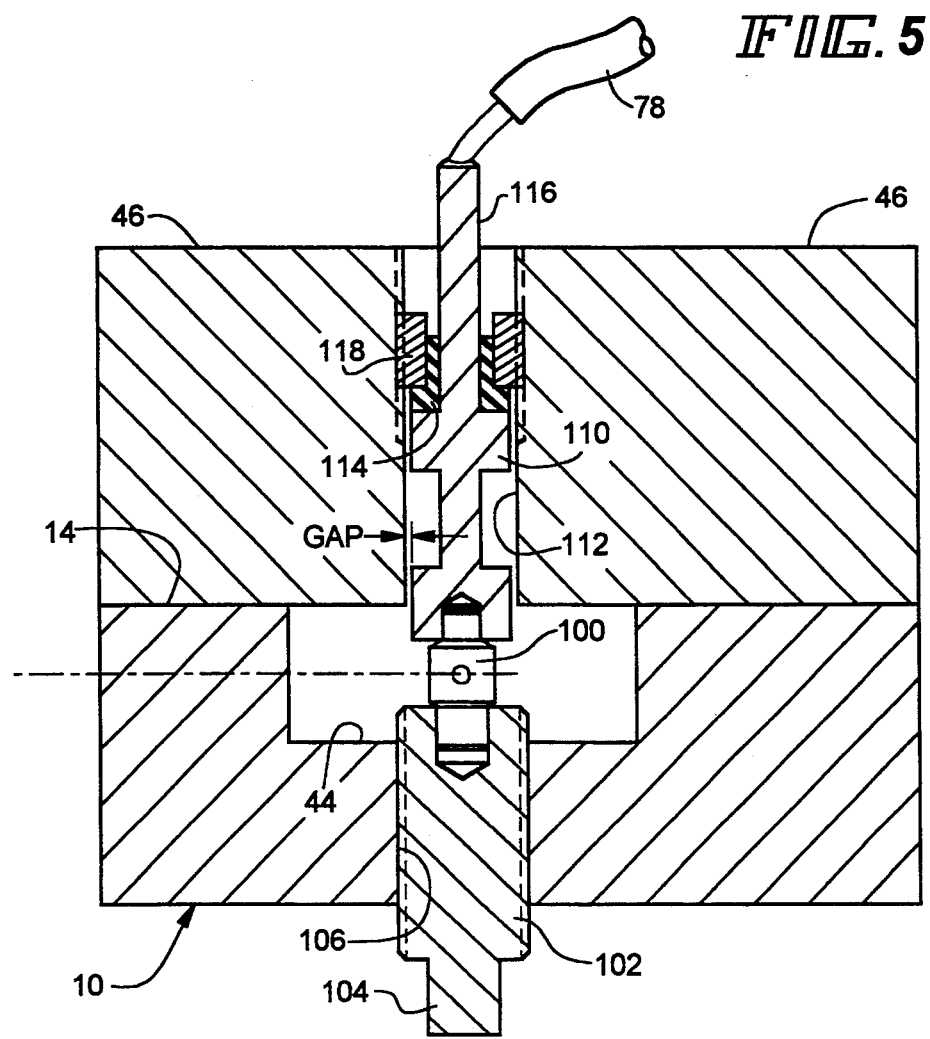

FIG. 5 illustrates the mounting of the receiving diode 100 in the turnstile cavity defining recess 44. A stud 102 having a square end 104 is threaded into a threaded bore 106 in the body 10 adjacent the end 14 so as to extend into the recess 44 and engage one pole of the diode 100. Oppositely thereof, a terminal 110 is received in a bore 112 within the plate 46 that is aligned with the bore 106. The terminal 110 is of lesser diameter than the bore 112 so as to be spaced therefrom by a gap. An insulating grommet 114 is disposed about a rod like end 116 of the terminal 110 and in turn is held in place by a small spanner ring 118 threaded into the bore 112. The electrical conductor 78 is, of course, connected to the end 116 and the terminal engager the other pole of the diode 100.

Appropriate adjustment may be achieved by placing a small wrench about the square end 104 of the stud 102 to rotate the same until the desired adjustment is achieved.

As seen in FIGS. 1 and 2, the antenna unit may be provided with a mounting ball 120 which is simply threaded into a recess 122 in the body 110 located between the opening 58 of the housing 56 and the groove 30.

Alternatively, the unit may be made part of a conventional spotlight. As is well known, traffic monitoring personnel frequently are provided with vehicles equipped with spotlights, the lights being located on the exterior of the vehicle but having an operator or handle extending into the vehicle to be operated by an occupant thereof.

Figure 6:
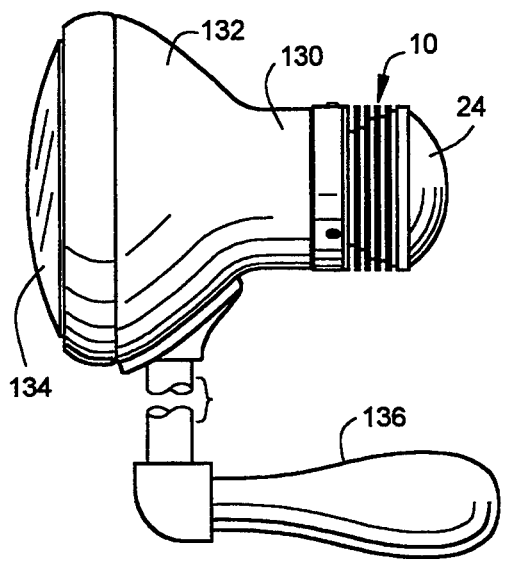
FIGS. 6, 7 and 8 illustrate various packages in which the radar antenna unit may be combined with an otherwise convention spotlight that may be located on the exterior of a vehicle.

FIG. 6 illustrates one embodiment of incorporation of the unit into a spotlight. In this embodiment, the body 10 is fitted into a reduced diameter, cylindrical end 130 of a spotlight housing 132. At the end of the housing 132 opposite the reduced diameter end 130 is a conventional spotlight lens 134 and, of course, a conventional spotlight will be contained within the housing 132. An operating handle 136 of conventional construction will typically be disposed in the interior of the vehicle whereas the housing 132 will be mounted on the exterior. Through appropriate manipulation of the housing 136, the housing 10, and thus the lens 24 can be focused in any desired direction.

Figure 7:
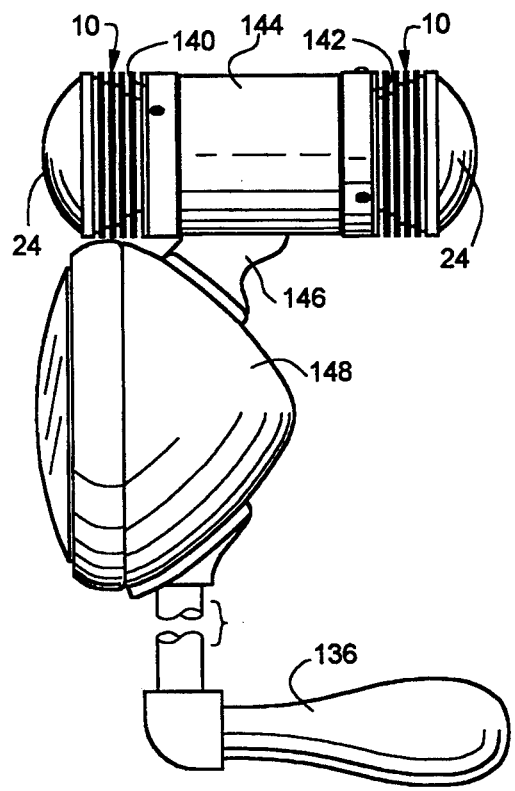
Figure 8:
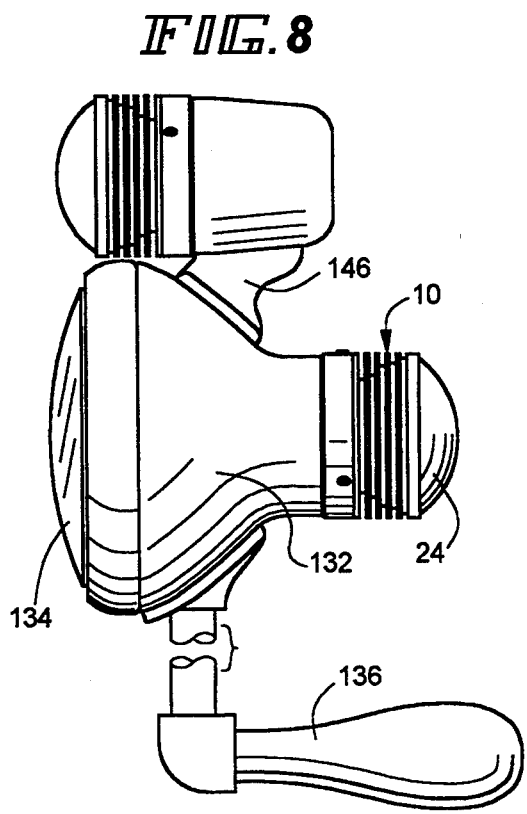

In some instances, it may be desirable to simultaneously monitor traffic coming from two opposite directions. In this case, a double antenna construction may be provided. FIGS. 7 and 8 illustrate two embodiments of the invention for achieving this end. Referring first to FIG. 7, two of the bodies 10 and associated lenses 24 are illustrated. The other, previously described elements of the antenna construction will be included as well and the same are introduced into opposite ends 140 and 142 of a cylindrical house 144. The housing 144 is then mounted by a suitable bracket 146 to the housing 148 of a conventional spotlight. Again, the device is equipped with an operating handle 136.

In FIG. 8, the unit illustrated in FIG. 6 is employed with the addition of the embodiment of FIGS. 1 and 2 being mounted on the housing 132 by a mounting bracket 146 but facing in the opposite direction from the first unit, that is, facing in the same direction as the spotlight.

The mounting arrangement shown in FIG. 6-8 advantageously retain the spotlight for the usual purposes while providing a ready means for adjustably mounting the antenna unit.

It will be observed that in the case of the embodiments illustrated in FIGS. 6, 7 and 8, necessary electrical wiring may take the same path as that used to provide controlled power to the spotlight itself.

From the foregoing, it will be appreciated that a radar antenna made according to the invention possesses a number of advantages over those here to foreknown.

As noted previously, the use of a press-fit lens 24 avoids alignment problems as well as any need to cement the lens in place.

The antenna unit requires only two seals to totally seal the device, one for the electrical conductors 78 and the other to seal the housing 56 to the body 10. The minimum number of interfaces requiring sealing assures that a good seal will be obtained.

The integral construction of the body 10 in providing the so-called horn or cavity 16 as well as the turnstile cavity 44 reduces assembly costs since there is no need to assemble separate parts to achieve the same construction. Importantly, this feature of the invention improves heat dissapation while additionally eliminating signal noise.

The present of the fins 40, and the fact that they are integral with the body 10, provides for excellent heat dissipation.

The particular location for the input of the electrical conductors avoids any need to provide separate openings or the like in the housing, thereby reducing expense.

In addition, the use of the press-fit lens allows the use of a lens of slightly smaller diameter than those conventionally employed. Those skilled in the art will readily appreciate that the material of which the lenses are conventionally formed is quite expensive and even the small reduction in diameter represents a substantial cost savings.

The shapes of the housing are simple and lend themselves to ready and easy fabrication and the device is readily susceptible to back-to-back mounting for use in a bidirectional antenna.

I claim:

1. A radar antenna for a radar transmitting and receiving unit used to monitor the speed of wheeled vehicle comprising:
   a body of metallic material including a cone shaped chamber having a wide end open to the exterior of the body and a narrow end opening to a turnstile cavity; and
   a plurality of heat dissipating fins formed on the exterior of said body around said chamber; the fins nearest the narrow end of said cavity being larger than the fins nearest the wide end of said cavity;
   said body being the sole antenna structure of said radar antenna.

2. The radar antenna of claim 1 wherein said body is generally in the form of a cylinder and said wide end of said chamber opens to one end of said cylinder, and said fins are defined by peripheral grooves in the surface of said cylinder adjacent said one end thereof.

3. The radar antenna of claim 2 wherein the ones of said grooves most remote from said one end are deeper than the ones of said grooves nearest said one end.

4. A radar antenna for a radar transmitting and receiving unit used to monitor the speed of a wheeled vehicle comprising:
   a body of metallic material including a cone shaped chamber having a wide end open to the exterior of the body and a narrow end opening to a turnstile cavity;
   a plurality of heat dissipating fins formed on the exterior of said body around said chamber;

an oscillator mounted on said body at said cavity; and a cup shaped housing element surrounding part of said body and containing said oscillator while leaving said fins exposed.

5. The radar antenna of claim 4 wherein said housing element is functionally imperforate and further including a seal at the interface of said housing element and said body.

6. The radar antenna of claim 4 wherein said housing element is a spot light housing.

7. The radar antenna of claim 4 wherein said housing includes a single opening in which said body is received.

8. A radar antenna comprising:

a generally cylindrical body of metallic material having opposed ends;

a cone shaped chamber in said body including a wide opening to one of said ends and a narrow opening to the other of said ends;

a plurality of peripheral grooves about the periphery of said body between the ends thereof, the grooves having a progressively greater depth from said one end to said other end;

an additional peripheral groove adjacent said other end, said additional groove being relatively shallow;

an O-ring in said additional groove; and a housing fitted to said body to receive said other end and sealing engaging said O-ring.

9. The radar antenna of claim 8 further including a recess in said other end and at least partially about said narrow opening; a radial bore in said body adjacent said other end and between said one end and said additional groove, said radial bore extending to said recess and terminating short of said narrow opening.

10. The radar antenna of claim 8 further including a lens press-fitted into said wide opening.

11. The radar antenna of claim 8 wherein said wide opening terminates in a short cylindrical section and said lens includes a cylindrical periphery press-fitted into said cylindrical section.

12. The radar antenna of claim 8 wherein said body, at said other end, includes a turnstile cavity opening away from said one end and intersecting said narrow opening, and an oscillator mounted on said body at one end of said turnstile cavity; and a plate closing said turnstile cavity and abutting and mounted on said body.

13. In a radar antenna, the combination of:

a solid one piece aluminum body;

a cone-shaped cavity having its wide end opening to the exterior of the body;

a lens fitted to said body over the wide end of said cavity;

a passage in said body and connected to said cavity at the end thereof opposite said wide end and extending away from said cavity;

a radially elongated recess in said body and intersecting said passage;

a cover secured to said body over said radially elongated recess so as to define a turnstile cavity together with said radially elongated recess; and a series of spaced grooves about said body in the exterior thereof, the part of the body between said grooves defining heat dissipatory fins.

* * * * *